US012115401B2

(12) United States Patent
Krutskevych et al.

(10) Patent No.: US 12,115,401 B2
(45) **Date of Patent: *Oct. 15, 2024**

(54) FIRE SPRINKLER WITH REMOTE RELEASE FUNCTION

(71) Applicant: MARIOFF CORPORATION OY, Vantaa (FI)

(72) Inventors: Nazar Krutskevych, Pomorske (PL); Wojciech Zimny, Pomorske (PL)

(73) Assignee: MARIOFF CORPORATION OY, Vantaa (FI)

( * ) Notice: Subject to any disclaimer, the term of this patent is extended or adjusted under 35 U.S.C. 154(b) by 744 days.

This patent is subject to a terminal disclaimer.

(21) Appl. No.: 16/972,198

(22) PCT Filed: Aug. 27, 2019

(86) PCT No.: PCT/EP2019/072828
§ 371 (c)(1),
(2) Date: Dec. 4, 2020

(87) PCT Pub. No.: WO2020/052963
PCT Pub. Date: Mar. 19, 2020

(65) Prior Publication Data

US 2021/0228925 A1 Jul. 29, 2021

(30) Foreign Application Priority Data

Sep. 13, 2018 (EP) .................................... 18194161

(51) Int. Cl.
*A62C 37/36* (2006.01)
*A62C 37/14* (2006.01)

(52) U.S. Cl.
CPC ............. *A62C 37/04* (2013.01); *A62C 37/14* (2013.01)

(58) Field of Classification Search
CPC ......... A62C 37/04; A62C 37/10; A62C 37/11; A62C 37/14; A62C 37/36; A62C 37/38; A62C 37/40; A62C 37/44
See application file for complete search history.

(56) References Cited

U.S. PATENT DOCUMENTS 2,245,144 A * 6/1941 Griffith ................. A62C 37/10 137/72
6,173,727 B1 1/2001 Davey
(Continued)

FOREIGN PATENT DOCUMENTS

CN 104288953 B 12/2017
EP 3028745 A1 6/2016
(Continued)

OTHER PUBLICATIONS

Critical System Solutions, "Fire Sprinkler Systems|Critical System Solutions", Fire Alarm Systems & Service, URL:http://www.criticalsystemsolutions.com/firesprinklersystems.html, Retrieved: Jul. 30, 2018, 12 pages.
(Continued)

*Primary Examiner* — Darren W Gorman
(74) *Attorney, Agent, or Firm* — CANTOR COLBURN LLP

(57) ABSTRACT

Provides are embodiments of a sprinkler and sprinkler system. The embodiments include a sprinkler body having a fluid inlet, a seal configured to prevent fluid flow through the sprinkler body when the seal is in a first position, and a bulb configured to retain the seal in the first position, the bulb configured to break at a temperature and allow the seal to move to a second position allowing fluid flow through the sprinkler body. The bulb includes a wireless power and communication unit configured to receive a wireless activation signal, an energy storing unit configured to store energy for a heating element, a control unit operably coupled
(Continued)

to the wireless power and communication unit and the energy storing unit, and the heating element configured to supply the energy to the fluid in the bulb responsive to a trigger.

8 Claims, 7 Drawing Sheets

(56) References Cited

U.S. PATENT DOCUMENTS

| | | | | |
|---|---|---|---|---|
| 6,302,146 | B1 | 10/2001 | McHugh | |
| 6,896,066 | B2 | 5/2005 | Gil | |
| 6,952,169 | B1 | 10/2005 | Simtion | |
| 7,633,393 | B2 | 12/2009 | Bonne | |
| 8,019,482 | B2 | 9/2011 | Sutardja | |
| 8,122,968 | B2 | 2/2012 | Johnson | |
| 9,345,916 | B1 | 5/2016 | Kirkbride | |
| 9,403,046 | B2 | 8/2016 | Schmitt et al. | |
| 2004/0194976 | A1* | 10/2004 | Kretzschmar | A62C 37/14 169/42 |
| 2006/0289175 | A1 | 12/2006 | Gutowski et al. | |
| 2007/0240886 | A1 | 10/2007 | Kil et al. | |
| 2009/0121860 | A1 | 5/2009 | Kimmel et al. | |
| 2010/0070097 | A1 | 3/2010 | Morgenstern et al. | |
| 2014/0225741 | A2 | 8/2014 | Gritzo et al. | |
| 2017/0120090 | A1* | 5/2017 | Magnone | A62C 3/002 |
| 2017/0304664 | A1* | 10/2017 | Tanklevski | A62C 37/14 |
| 2018/0050351 | A1 | 2/2018 | Hall et al. | |
| 2018/0200552 | A1 | 7/2018 | Wertsberger | |
| 2018/0361183 | A1* | 12/2018 | Tanklevski | A62C 37/04 |
| 2019/0083833 | A1* | 3/2019 | Müller | A62C 37/04 |
| 2019/0247689 | A1* | 8/2019 | Trivelpiece | F16K 37/005 |

FOREIGN PATENT DOCUMENTS

| | | | | |
|---|---|---|---|---|
| EP | 3623019 | A1 | 3/2020 | |
| KR | 20170136237 | A | 12/2017 | |
| WO | WO-2009145661 | A1 * | 12/2009 | A62C 37/14 |
| WO | 2020052963 | A1 | 3/2020 | |

OTHER PUBLICATIONS

Extended European Search Report for Application No. 18194161.8-1113, Date of Mailing: Feb. 11, 2019, 7 pages.

International Search Report and Written Opinion for Application No. PCT/EP2019/072828; International Filing date: Aug. 27, 2019; Mailing Date: Oct. 30, 2019, 11 pages.

Rachio, "Rachio Generation 2 Smart Sprinkler Controller: Automate Your Watering", URL: https://www.rachio.com/gen2/, Retrieved Jul. 30, 2018, 14 pages.

Wikipedia, "Wireless power transfer", XP05550449, URL: https://en.wikipedia.org/w/index.php?title=Wireless_power_transfer&oldid=859024997, Retrieved: Jan. 2, 2019, 24 pages.

EP Office Action; Issued: Feb. 10, 2021; Application No. 18194161.8; Filed: Sep. 13, 2018; 9 pages.

International Preliminary Report on Patentability mailed Mar. 19, 2021 for Application No. PCT/EP2019/072828.

* cited by examiner

FIRE SPRINKLER WITH REMOTE RELEASE FUNCTION

BACKGROUND

The embodiments disclosed herein relate generally to sprinkler systems, and more particularly, to a sprinkler device having a remote release function and a sprinkler system for use thereof.

Sprinkler systems typically include a plurality of sprinklers for emitting a fire suppression fluid in the event of a fire. Systems may track the location and/or status of each sprinkler using “smart” sprinklers fitted with wiring, sensors, processors, etc. Such sprinklers can be difficult to install on existing water distribution networks, since the electronics must be implemented inside the sprinkler body. Furthermore, such installations may require additional certification prior to operation.

BRIEF SUMMARY

According to an embodiment, a sprinkler device is shown. The sprinkler device includes a sprinkler body having a fluid inlet; a seal configured to prevent fluid flow through the sprinkler body when the seal is in a first position; and a bulb configured to retain the seal in the first position, the bulb configured to break at a temperature and allow the seal to move to a second position allowing fluid flow through the sprinkler body. The bulb includes a wireless power and communication unit configured to receive a wireless activation signal; an energy storing unit configured to store energy for a heating element, wherein the energy is received from the wireless power and communication unit; a control unit operably coupled to the wireless power and communication unit and the energy storing unit, wherein the control unit is configured to trigger a release of the energy stored in the energy storing unit responsive to the activation signal; and the heating element configured to supply the energy to the fluid in the bulb responsive to the trigger.

In addition to one or more of the features described herein, or as an alternative, further embodiments may include a remote activation signal that is triggered by an alarm signal of a fire sprinkler system.

In addition to one or more of the features described herein, or as an alternative, further embodiments may include a bulb that is configured to provide status information of the sprinkler including a unique identifier and diagnostic state information of the sprinkler.

In addition to one or more of the features described herein, or as an alternative, further embodiments may include a sprinkler that operates in dual modes comprising a normal mode and a remote activation mode.

In addition to one or more of the features described herein, or as an alternative, further embodiments may include when in the normal mode, the bulb, a thermally responsive frangible bulb, is configured to break at a threshold temperature allowing the seal to move to a second position.

In addition to one or more of the features described herein, or as an alternative, further embodiments may include when in the remote activation mode, the bulb is configured to break responsive to the activation signal allowing the seal to move to a second position.

In addition to one or more of the features described herein, or as an alternative, further embodiments may include a wireless power and communication unit comprises an RFID device configured to receive the wireless signal.

In addition to one or more of the features described herein, or as an alternative, further embodiments may include an energy storing unit that is a dedicated energy storing unit.

According to a different embodiment, a method for operating a sprinkler with a remote release function is provided. The method includes detecting, by a remote activation module of a sprinkler, an activation signal; storing energy responsive to detecting the activation signal; releasing the energy to a heating element, wherein the heating element is configured to supply heat to fluid in a bulb of the sprinkler; and activating the sprinkler of a sprinkler system.

In addition to one or more of the features described herein, or as an alternative, further embodiments may include an activation signal that is triggered by an alarm signal of a fire sprinkler system.

In addition to one or more of the features described herein, or as an alternative, further embodiments may include providing status information of the sprinkler including a unique identifier and diagnostic state information of the sprinkler.

In addition to one or more of the features described herein, or as an alternative, further embodiments may include operating the sprinkler in dual modes including a normal mode and a remote activation mode.

In addition to one or more of the features described herein, or as an alternative, further embodiments may include when in the normal mode, the bulb is configured to break at a threshold temperature allowing the seal to move to a second position.

In addition to one or more of the features described herein, or as an alternative, further embodiments may include when in the remote activation mode, the bulb is configured to break responsive to the activation signal allowing the seal to move to a second position.

In addition to one or more of the features described herein, or as an alternative, further embodiments may include an activation signal is an RFID signal.

In addition to one or more of the features described herein, or as an alternative, further embodiments may include a stored energy that is only supplied to the heating element.

According to another embodiment, a sprinkler system is provided. The sprinkler system includes a fluid source; a pipe coupled to the fluid source; a sprinkler coupled to the pipe, the sprinkler including a bulb housing a remote activation module configured to activate the sprinkler responsive to an activation signal; and a wireless power source and communication unit configured to transmit the activation signal to the remote activation module.

In addition to one or more of the features described herein, or as an alternative, further embodiments may include a remote activation module that includes a wireless power and communication unit configured to receive a wireless activation signal; an energy storing unit configured to store energy for a heating element, wherein the energy is received from the wireless power and communication unit; a control unit operably coupled to the wireless power and communication unit and the energy storing unit, wherein the control unit is configured to trigger a release of the energy stored in the energy storing unit responsive to the activation signal; and the heating element configured to supply the energy to the fluid in the bulb responsive to the trigger.

In addition to one or more of the features described herein, or as an alternative, further embodiments may include a wireless power and communication unit that includes an RFID device configured to detect an RFID signal from the wireless power source and communication unit.

In addition to one or more of the features described herein, or as an alternative, further embodiments may include a remote activation module that is configured to provide status information of the sprinkler including a unique identifier and diagnostic state information of the sprinkler.

Technical effects of embodiments of the present disclosure include a sprinkler device having a remote sprinkler release function capability. The technical effects and benefits provide for advanced protection for fire protection of evacuation pathways and other critical areas.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Sprinklers are distributed throughout an area to provide fire suppression. However, the sprinklers are generally activated when the heating element of the sprinkler reaches a temperature that is sufficient to cause the sprinkler bulb to break. This can cause delays in activating the sprinkler while the sprinkler is waiting to reach the threshold temperature which can lead to unnecessary damage to property. Currently, the sprinklers also include wires that can cause issues with installation and/or reliability if the wires come into contact with the liquid.

The techniques described herein provide for sprinklers that can be remotely activated to provide advance protection in critical areas and evacuation pathways. Instead of waiting for the sprinklers to reach a threshold temperature, the sprinklers can be configured to be triggered upon an alarm event such as activation of a fire alarm or some other remote activation event. These remotely activated sprinklers include remote activation modules that use RFID technology to trigger the activation of the sprinkler. In addition, the sprinklers can function as normal sprinklers in addition to functioning as a remotely operated sprinkler.

Figure 1:
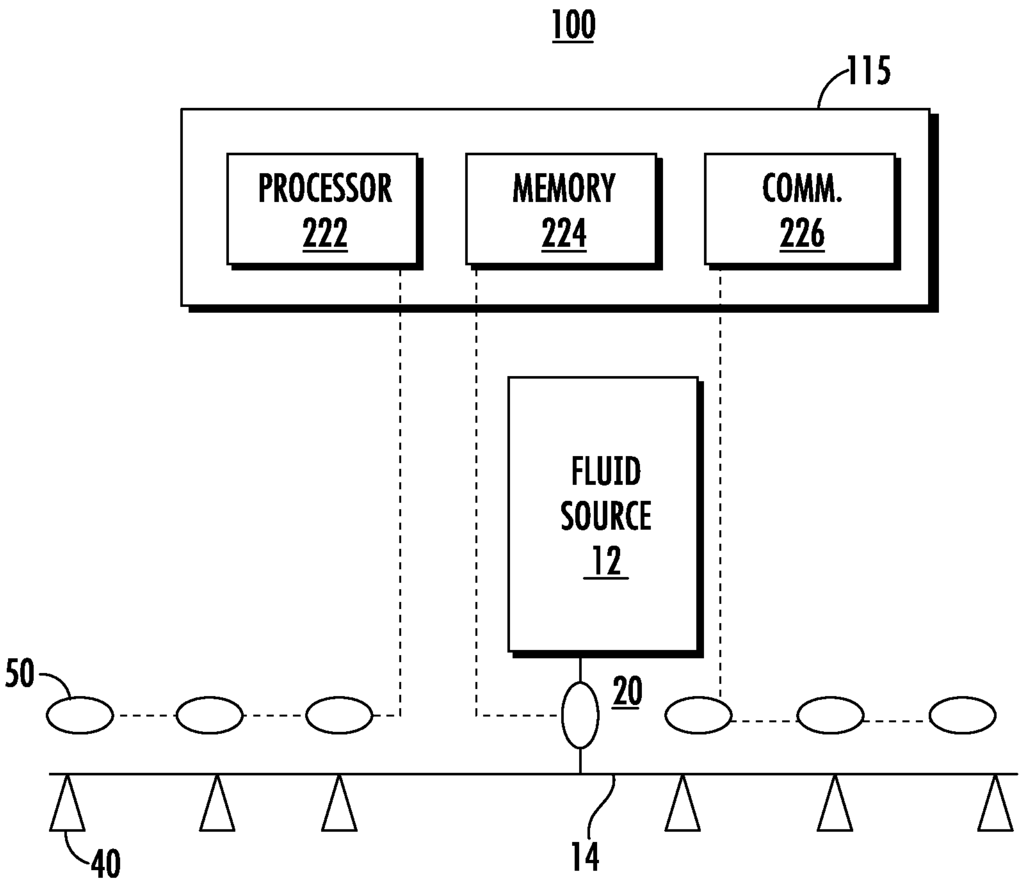
FIG. 1 depicts a sprinkler system including a sprinkler with a remote release function in accordance with one or more embodiments.

FIG. 1 depicts a sprinkler system 100 in an example embodiment. The sprinkler system 100 includes a fluid source 12 connected to one or more sprinklers 40 via one or more pipes 14. The fluid source 12 may be water and may be under pressure to direct the fluid to the sprinklers 40. In other embodiments, a pump may be used to direct fluid to the sprinklers 40. The sprinkler system 100 may be a "wet pipe" type system, in which fluid is present in pipes 14. Upon breakage of a bulb at a sprinkler 40, a seal is opened and fluid is emitted at the sprinkler 40.

A controller 115 communicates with elements of the sprinkler system 100 as described herein. The controller 115 may include a processor 222, a memory 224, and communication module 222. The processor 222 can be any type or combination of computer processors, such as a microprocessor, microcontroller, digital signal processor, application specific integrated circuit, programmable logic device, and/or field programmable gate array. The memory 224 is an example of a non-transitory computer readable storage medium tangibly embodied in the controller 115 including executable instructions stored therein, for instance, as firmware. The communication module 226 may implement one or more communication protocols to communicate with other system elements. The communication module 226 may communicate over a wireless network, such as 802.11x (WiFi), short-range radio (Bluetooth), or any other known type of wireless communication. The communication module 226 may communicate over wired networks such as LAN, WAN, Internet, etc.

One or more readers 50 obtain an identifier from each sprinkler 40. The readers 50 may be RFID readers that read a unique, sprinkler identification code from an identification device at each sprinkler 40. In one embodiment, a single reader 50 is associated with each sprinkler 40 in a one-to-one fashion. The readers 50 may communicate with one or more sprinklers 40 using wireless protocols (NFC, radio waves, etc.). The readers 50 communicate with controller 115 over a wireless and/or wired network. The readers 50 may also form a mesh network, where data is transferred from one reader 50 to the next, eventually leading to the controller 115. Each reader 50 is programmed with a unique, reader identification code that identifies each reader 50 to the controller 115.

The sprinkler system 100 includes one or more sensors 20. Sensor 20 detects one or more fluid parameters, such as fluid pressure in pipes 14 or fluid flow in pipes 14. Sensor(s) 20 may be located at the outlet of the fluid source 12 or along various locations along pipes 14. The fluid parameter is used by the controller 115 to determine the status of the sprinkler system 100 (e.g., has a sprinkler 40 been activated). Sensor 20 communicates with controller 115 over a wireless and/or wired network. Controller 115 uses the fluid parameter from sensor 20 and the presence or absence of sprinkler identification codes to determine the state of each sprinkler 40.

Figure 2:
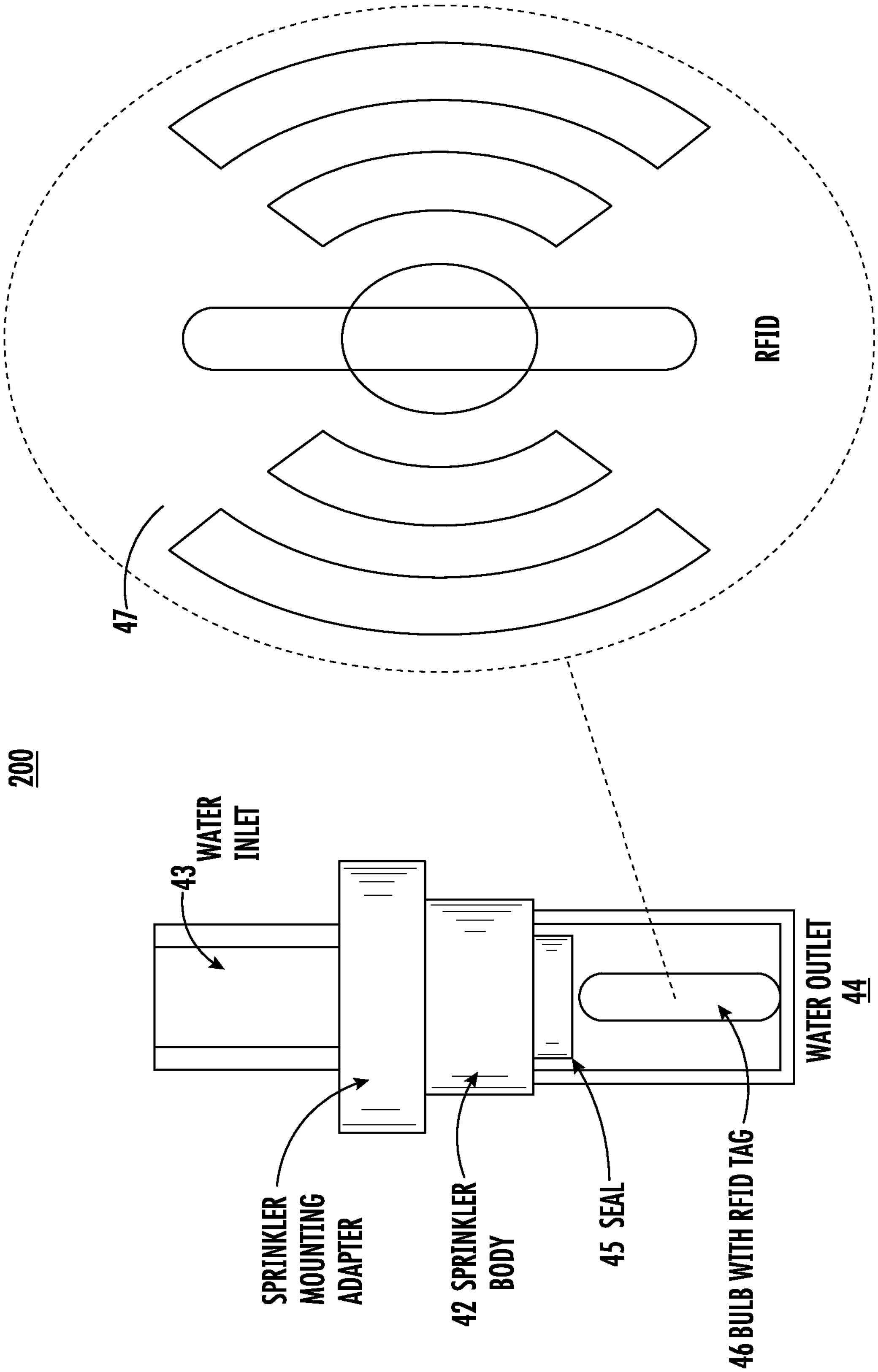
FIG. 2 depicts a sprinkler in accordance with one or more embodiments.

FIG. 2 depicts a sprinkler 200 in an example embodiment. The sprinkler 200 includes a sprinkler body 42 having a fluid inlet 43 and fluid outlet 44. The fluid inlet 43 is in fluid communication with pipe 14. Between the fluid inlet 43 and the fluid outlet 44 is a seal 45. A bulb 46 maintains the seal in a first position (i.e., closed) preventing fluid from exiting the fluid outlet 44. The bulb 46 may be a thermally responsive, frangible bulb having a liquid within a container (e.g., quartzoid bulb). When the bulb 46 breaks due to temperature, the seal 45 moves to a second position allowing fluid to flow through the sprinkler 200. The bulb 46 includes an RFID device 47, wherein the RFID device is configured to receive a signal that is used to remotely activate the sprinkler 200.

Figure 3:
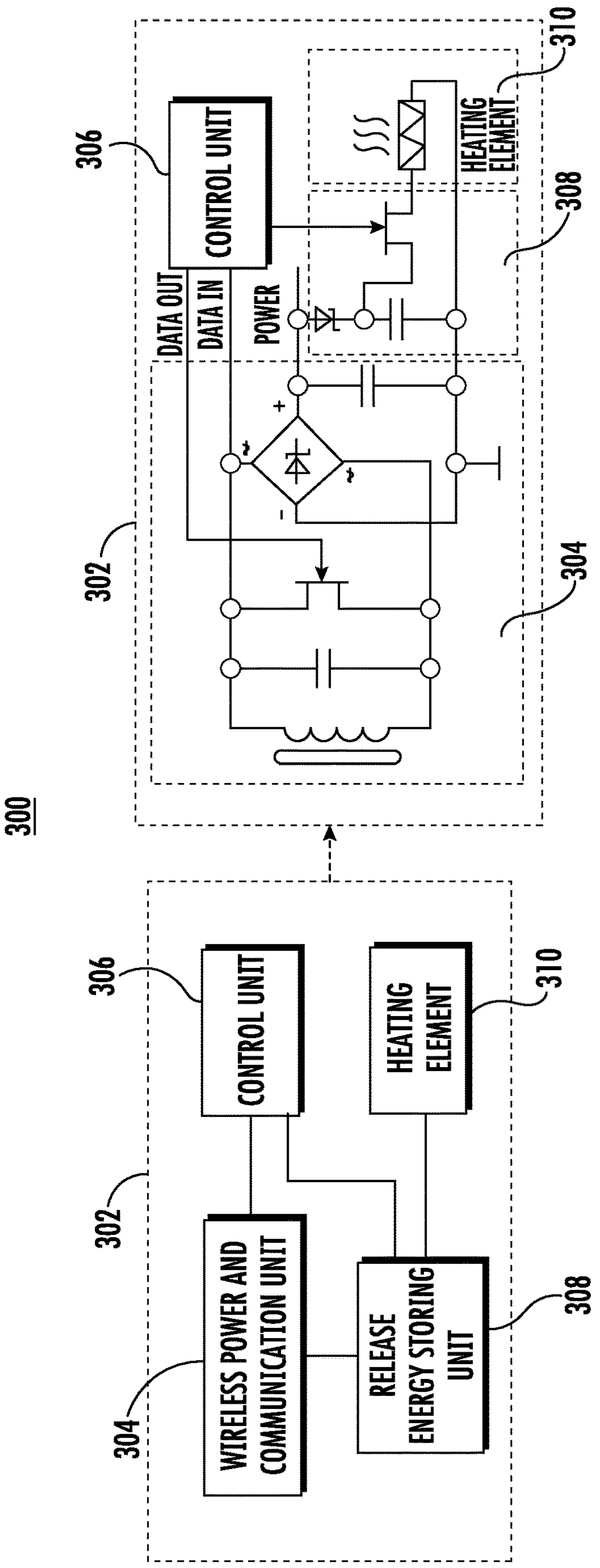
FIG. 3 depicts an architecture of a sprinkler bulb in accordance with one or more embodiments.

FIG. 3 depicts an architecture 300 of the sprinkler bulb 46 in accordance with one or more embodiments. As shown, the bulb 46 includes a remote activation module 302 that houses a plurality of units for remotely activating the sprinkler. The wireless power and communication unit 304 is configured to communicate with an external system (not shown) such as an external fire system that performs a supervisory function or management function of the sprinklers. The wireless power and communication unit 304 is configured to receive and send data to the control unit 306. The wireless power and communication unit 304 is also configured to send a signal to the energy storing unit 308 to charge the energy storing unit 308. In one or more embodiments, the wireless power and communication unit 304 is configured to communicate with a wireless power source and communication unit 410 (shown in FIG. 4).

An example of the architecture of the wireless power and communication unit 304 includes a plurality of circuit elements as shown in FIG. 3. In one or more embodiments, the wireless power and communication unit 304 includes RFID technology to receive the wireless signal to be stored in the energy storing unit 308. For example, the circuit can include a magnetic antenna to detect and receive the wireless signal.

The control unit 306 is configured for bidirectional communication. In particular the control unit 306 is configured to receive data such as data from the external system. This data includes a status request for each of the sprinkler unit (based on the unique ID) such as activated/not activated or the data can include a command to trigger the activation of the heating element. The appropriate sensors can be included in the sprinkler to detect the pressure of the fluid in the bulb 46.

The control unit 306 is configured to send data to the wireless power and communication unit 304 such as the status information of a bulb along with a unique identifier. In addition, the control unit 306 is coupled to the energy storing unit 308 to trigger the activation of the heating element 308. In one or more embodiments, the control unit 306 can include a memory that stores a unique identifier so each individual sprinkler device can be addressed.

In one or more embodiments, the control unit 306 is configured to operate the sprinkler device in a dual mode including a normal mode and a remote activation mode. In the normal mode, the bulb will break when exposed to enough thermal energy which activates the sprinkler device. In a remote activation mode, the bulb will break responsive to a control signal from the control unit 306 which causes the energy storing unit 308 to release its energy to the heating element 310.

As shown in FIG. 3, the energy storing unit 308 includes a number of circuit elements including a diode, capacitor and a switch. The energy storing unit 308 is configured to store energy received from the wireless power and communication unit 304 in the capacitor. The switch is controlled by the control unit 306 and the output of the switch is coupled to the heating element 310 allowing the capacitor to discharge the stored energy into the heating element 310. It is to be understood that other configuration can be used for the energy storing unit 308.

As mentioned above, the heating element 310 can include a heating coil that is configured to heat the fluid of the bulb 46 responsive to the activation signal. It is to be understood that alternative mechanisms can be used in the sprinkler device where the heating element is an explosive element, ignitor element, semiconductor fuse, etc. that can be remotely operated. In one or more embodiments, the heating element 310 directly contacts the fluid in the bulb which allows heating of the fluid to break the bulb 46. In other embodiments, the remote activation module 302 is in contact with the fluid where the fluid is a non-conductive liquid that allows for the proper operations of the module.

Figure 4:
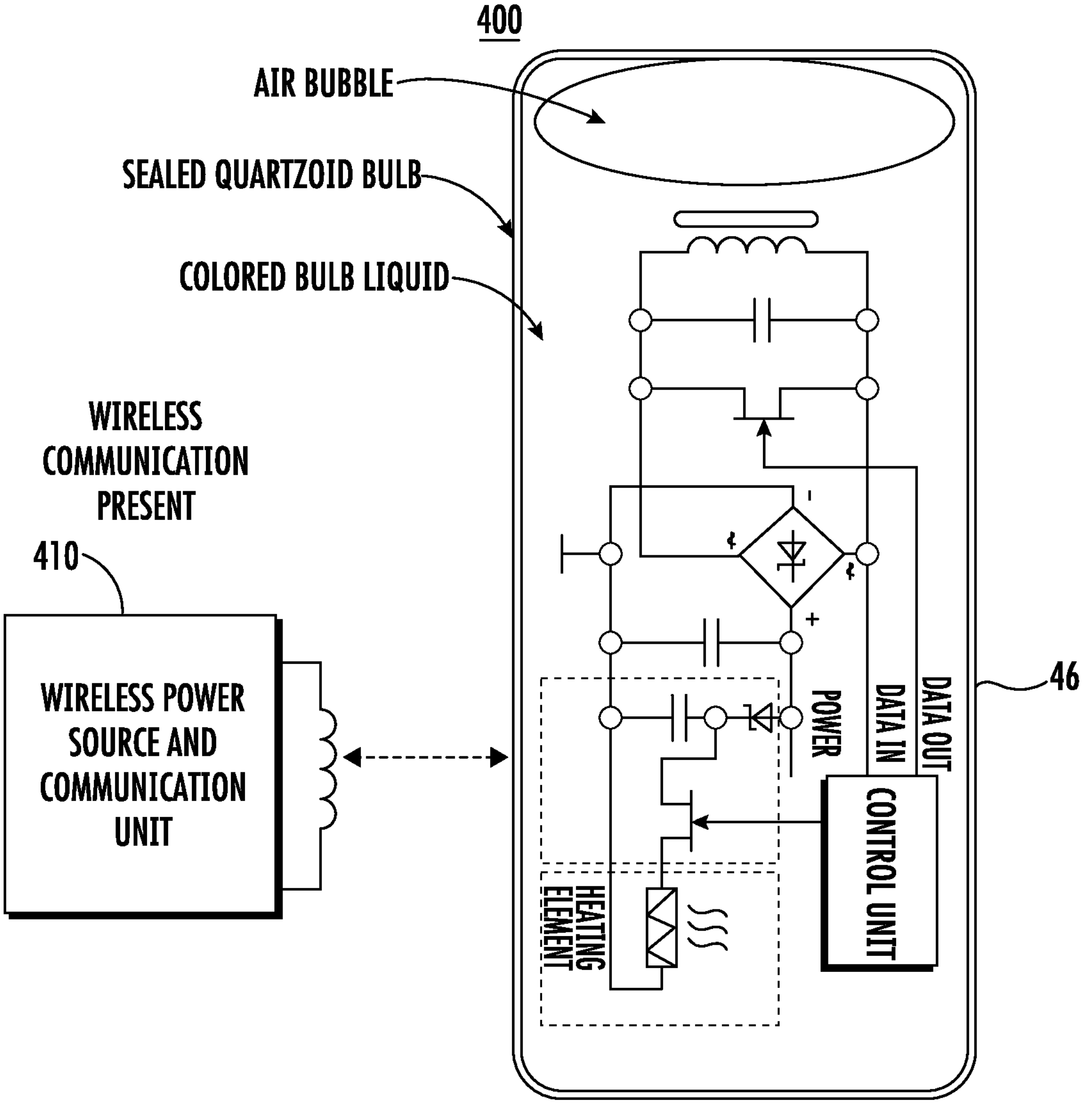
FIG. 4 depicts a normal state of the bulb in accordance with one or more embodiments.

FIG. 4 depicts a normal state 400 of the bulb in accordance with one or more embodiments. As shown in FIG. 4, the bulb 46 is a sealed quartzoid bulb that is filled with a liquid that expands as a result of thermal heating. The liquid is filled in the bulb to a level that leaves an air-filled bubble or fluid vapor-filled bubble that allows the liquid to expand before the bulb is broken. Also shown in FIG. 4, a wireless power source and communication unit 410 that is configured to communicate with the wireless power and communication unit 304 of the bulb. The wireless power source and communication unit 410 can be operably coupled to an external system, such as a fire alarm system. In addition, the wireless power source and communication unit 410 can be operably coupled to a plurality of sprinkler devices or each sprinkler device can be coupled to an individual source that is within proximity of its signal range. The signal can include a magnetic signal.

Figure 5:
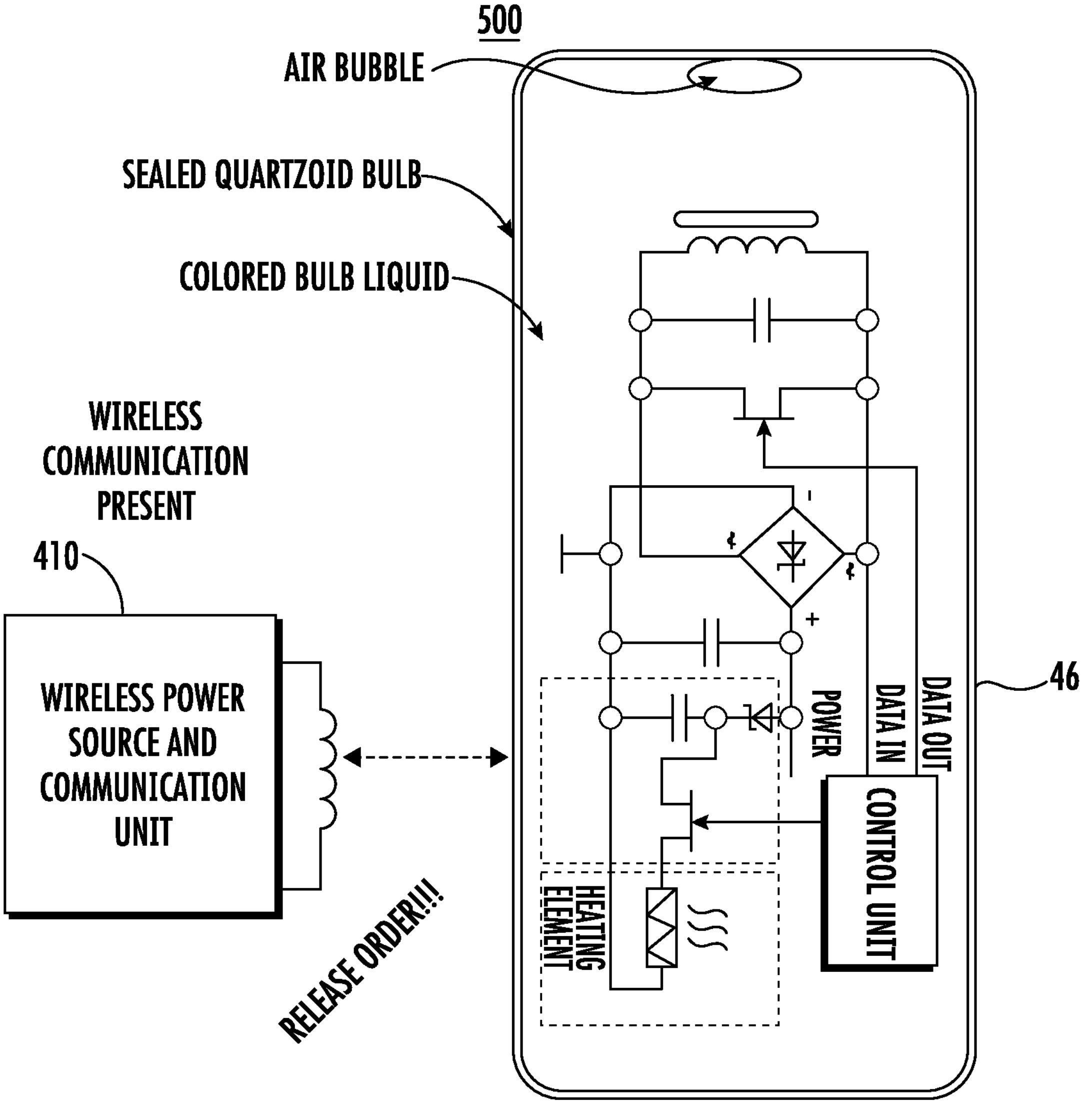
FIG. 5 depicts a pre-release state of the bulb in accordance with one or more embodiments.

FIG. 5 depicts a pre-release state 500 of the bulb in accordance with one or more embodiments. As shown in FIG. 5 the bulb has received an activation signal from the wireless power source and communication unit 410 causing the energy storing unit 308 to discharge the energy into the heating element 310. The heating element 310 causes the liquid to heat up and expand displacing the volume of the an air-filled bubble or fluid vapor-filled bubble.

Figure 6:
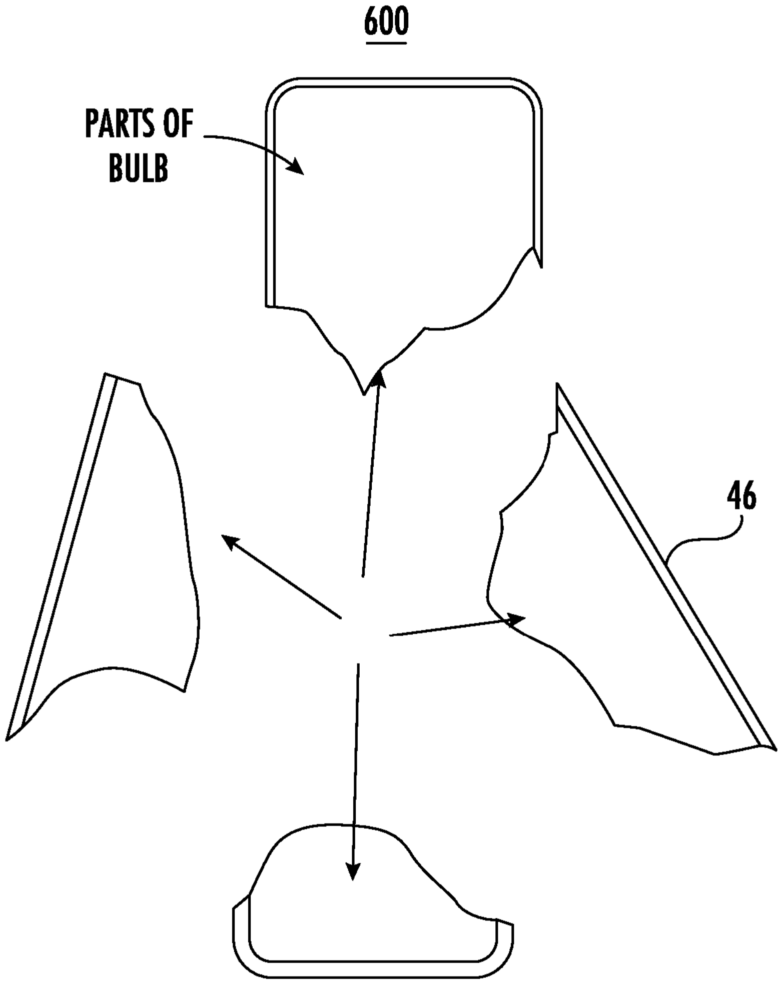
FIG. 6 depicts a sprinkler release state of the bulb in accordance with one or more embodiments.

In FIG. 6, a sprinkler bulb is illustrated in a sprinkler release state 600. As shown in FIG. 6, the sprinkler bulb is broken into several fragments. In one or more embodiments, the sprinkler bulb 46 has been broken as a result of a remote activation signal. In another embodiment, the sprinkler bulb 46 has been broken as a result of sensing thermal heat.

Figure 7:
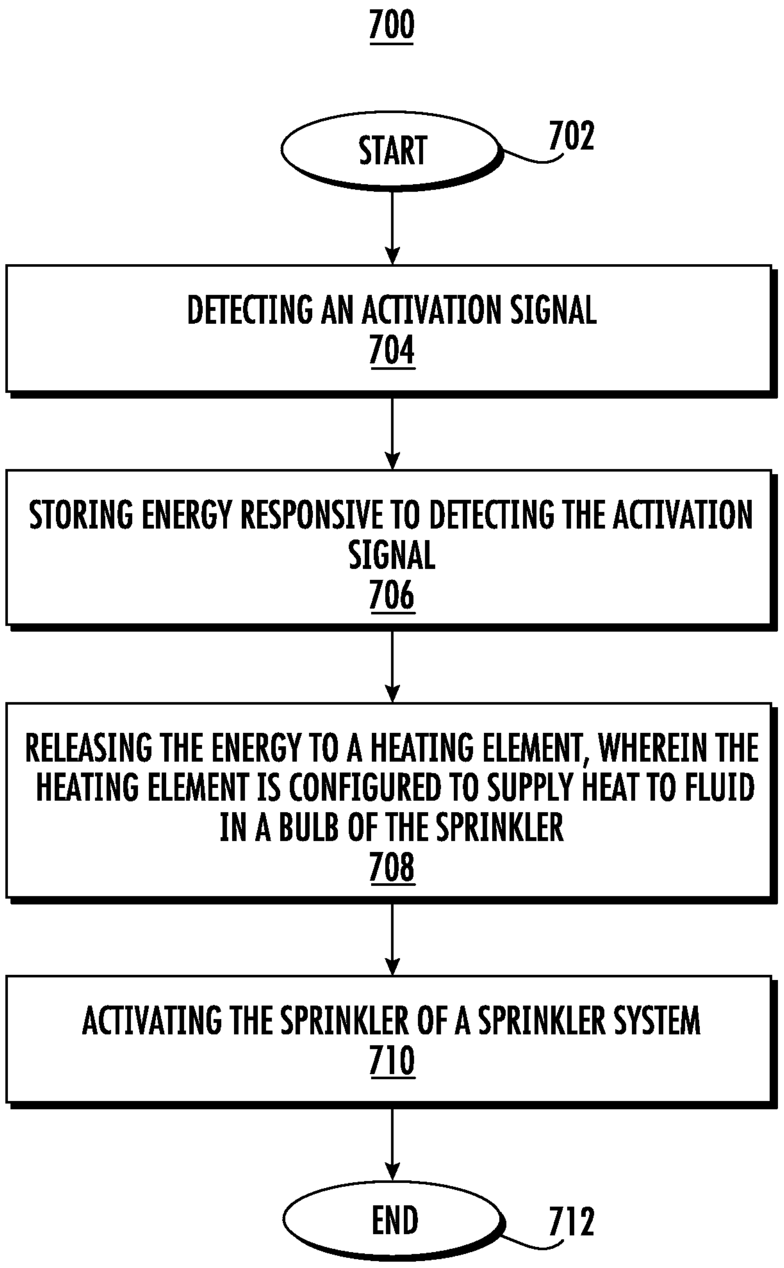
FIG. 7 depicts a flowchart of a method for operating a sprinkler with a remote release function in accordance with one or more embodiments.

FIG. 7 depicts a flowchart of a method 700 for operating a sprinkler with a remote release function in accordance with one or more embodiments. The method 700 begins at block 702 and continues to block 704 which provides for detecting an activation signal. In one or more embodiments, the activation signal is an RFID signal that is used to activate a sprinkler device. The method 700 proceeds to block 706 which provides for storing energy responsive to detecting the activation signal. At block 708, the method 700 provides for releasing the energy to a heating element, wherein the heating element is configured to supply heat to the fluid in a bulb of the sprinkler. The method 700 at block 710 provides for activating the sprinkler of the sprinkler system. When the bulb breaks, a seal moves from a first position to a second position to allow fluid flow through the component. Thus, embodiments are not limited to sprinklers, but rather any component using a bulb to control fluid flow. The method 700 ends block 712.

The technical effects and benefits include a reduction in time and complexity of assembling bulb into the sprinkler system. Also, the technical effects and benefits include an increase in bulb reliability by the elimination of heat coil lead wires and providing the ability to poll the status of each of the sprinkler devices. The technical effects and benefits include operating the sprinkler device in a dual mode including a remote activation mode and the normal mode. The technical effects and benefits include a wireless and battery-free solution for remote sprinkler activation functionality without any negative impact on functional delay.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A sprinkler comprising:

a sprinkler body having a fluid inlet;

a seal configured to prevent fluid flow through the sprinkler body when the seal is in a first position; and a bulb configured to retain the seal in the first position, the bulb configured to break at a temperature and allow the seal to move to a second position allowing fluid flow through the sprinkler body, wherein the bulb comprises:

a wireless power and communication unit configured to receive a wireless activation signal;

an energy storing unit configured to store energy for a heating element, wherein the energy is received from the wireless power and communication unit;

a control unit operably coupled to the wireless power and communication unit and the energy storing unit, wherein the control unit is configured to trigger a release of the energy stored in the energy storing unit responsive to the activation signal; and the heating element configured to supply the energy to a fluid in the bulb responsive to the trigger.

2. The sprinkler of claim 1, wherein the activation signal is triggered by an alarm signal of a fire sprinkler system.

3. The sprinkler of claim 2, wherein the bulb is configured to provide status information of the sprinkler including a unique identifier and diagnostic state information of the sprinkler.

4. The sprinkler of claim 2, wherein the sprinkler operates in dual modes comprising a normal mode and a remote activation mode.

5. The sprinkler of claim 4, when in the normal mode, the bulb is a thermally responsive frangible bulb configured to break at a threshold temperature allowing the seal to move to the second position.

6. The sprinkler of claim 4, when in the remote activation mode, the bulb is configured to break responsive to the activation signal allowing the seal to move to the second position.

7. The sprinkler of claim 1, wherein the wireless power and communication unit comprises an RFID device configured to receive the wireless signal.

8. The sprinkler of claim 1, wherein the energy storing unit is a dedicated energy storing unit.

* * * * *